United States Patent
Ramesh et al.

(10) Patent No.: US 7,277,920 B2
(45) Date of Patent: Oct. 2, 2007

(54) IMPLEMENTING APPLICATIONS REQUIRING ACCESS TO MULTIPLE FILES

(75) Inventors: Roshin Lal Ramesh, Kerala (IN); Manisha Choithwani, Uttar Pradesh (IN)

(73) Assignee: Texas Instruments Incorporated, Dallas, TX (US)

( * ) Notice: Subject to any disclaimer, the term of this patent is extended or adjusted under 35 U.S.C. 154(b) by 861 days.

(21) Appl. No.: 10/419,246

(22) Filed: Apr. 21, 2003

(65) Prior Publication Data

US 2004/0210905 A1 Oct. 21, 2004

(51) Int. Cl.
*G06F 15/16* (2006.01)
(52) U.S. Cl. .......................... 709/209; 326/38; 326/40; 326/46
(58) Field of Classification Search ................ 709/209; 719/310; 326/38, 40, 46
See application file for complete search history.

(56) References Cited

U.S. PATENT DOCUMENTS

| | | | |
|---|---|---|---|
| 5,623,680 A * | 4/1997 | Flora-Holmquist et al. | 712/232 |
| 6,324,496 B1 * | 11/2001 | Alur et al. | 703/17 |
| 6,670,896 B2 * | 12/2003 | Hayami | 341/59 |
| 7,039,893 B2 * | 5/2006 | DenBraber | 716/16 |

* cited by examiner

*Primary Examiner*—Frantz B. Jean
(74) *Attorney, Agent, or Firm*—Alan K. Stewart; W. James Brady; Frederick J. Telecky, Jr.

(57) ABSTRACT

The control flow underlying an application is represented in the form of a FSM (Finite State Machine) containing multiple states, transitions between states, and tasks associated with each transition. An execution block iteratively (in loops) transitions between the states according to the FSM representation, performing various operations according to the specified tasks in the transitions. In an embodiment, each state is associated with utmost one file providing inputs to the application. Such an approach provides an explicit control flow and easier way to develop and manage an application.

9 Claims, 5 Drawing Sheets

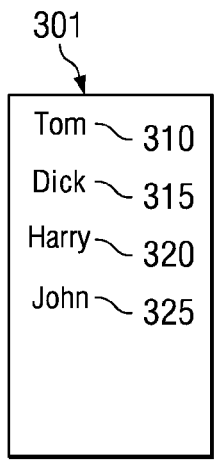
*FIG. 3A*
*(PRIOR ART)*
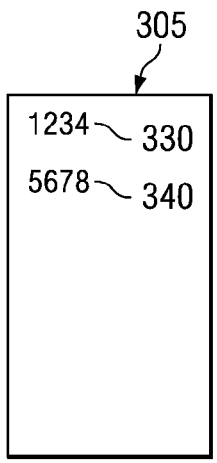
*FIG. 3B*
*(PRIOR ART)*
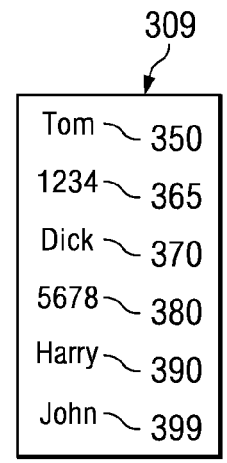
*FIG. 3C*
*(PRIOR ART)*
```
while ((not empty N) and (not empty H)) {   ~ 410
  p=read (N)   ~ 420
  q=read (H)   ~ 430
  print (O, p, q) }   ~ 440
while (not empty N){   ~ 450
  p=read (N)   ~ 460
  print (O, p) }   ~ 470
while (not empty H){   ~ 480
  q=read (H)   ~ 490
  print (O, q) }   ~ 499
```
*FIG. 4*
*(PRIOR ART)*

US 7,277,920 B2

IMPLEMENTING APPLICATIONS REQUIRING ACCESS TO MULTIPLE FILES

BACKGROUND OF THE INVENTION

1. Field of the Invention

The present invention relates to data processing, and more specifically to a method and apparatus for implementing applications requiring access to multiple files.

2. Related Art

Applications are often designed to access multiple files. For example, a merge application may retrieve a row of data from each of several input files and write the rows into an output file. Successive respective rows of the input files may be retrieved and written into the output file until all the rows of the input files are written. More complex operations may be performed while accessing multiple files, even though the description is provided substantially with respect to merge-type simple applications.

One problem with such applications is the corresponding software code is often written in unstructured manner (e.g., with file open/close statements and data read statements being placed in an ad-hoc fashion), making the software code (or underlying logic) difficult to understand. Such understandability may be important at least in situations when the application has to be debugged (or maintained, in general) or to re-use the code in other applications.

SUMMARY OF THE INVENTION

According to an aspect of the present invention, a system receives as input a representation of a finite state machine (FSM) which specifies a control flow of an application, and examines the FSM to perform operations according to said FSM to execute the application. By representing the control flow in the form of a FSM, the control flow may be easily understandable, thereby leading to ease of maintenance.

In one embodiment, the FSM contains a multiple states and a multiple transitions, with each transition specifying a change from one state to another state. A specific input value and a corresponding task may be specified associated with each transition. The task specified with a transition may be performed by executing a corresponding operations.

In one implementation, the inputs for each state are provided from utmost one file. Due to such a feature, several advantages may be realized. For example, understandability of control flow is enhanced since the read instructions are not interspersed through the code implementing various tasks. The overhead of maintenance of the application may be reduced as a result.

An execution block may begin with a start state specified in the FSM, read an input value from the associated file, and determine the transition based on the input value. The task associated with the transition is performed, and the next state is determined. The input value is retrieved from the file associated with the next state, and the transition is determined based on the retrieved value. The approach is repeated iteratively to implement the application.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the following accompanying drawings:

FIG. (FIG.) 1 is a block diagram illustrating an example system in which the present invention can be implemented;

FIGS. 3A-3C represent set of files illustrating prior art a merge application;

FIG. 4 is software code illustrating a typical prior approach of implementing the merge application;

DETAILED DESCRIPTION OF THE PREFERRED EMBODIMENTS

1. Overview

An aspect of the present invention enables the control flow underlying an application to be specified in the form of a finite state machine (FSM). An execution block may perform various operations according to the FSM to execute the application. In an embodiment, each state is associated with utmost one file the application may be required to read.

Due to the use of FSM, the control flow may be easily understood, thereby potentially leading to ease of maintenance (e.g., debugging any problems encountered). By associating each state with utmost one file, understandability of the overall (control and data) flow may be further enhanced.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
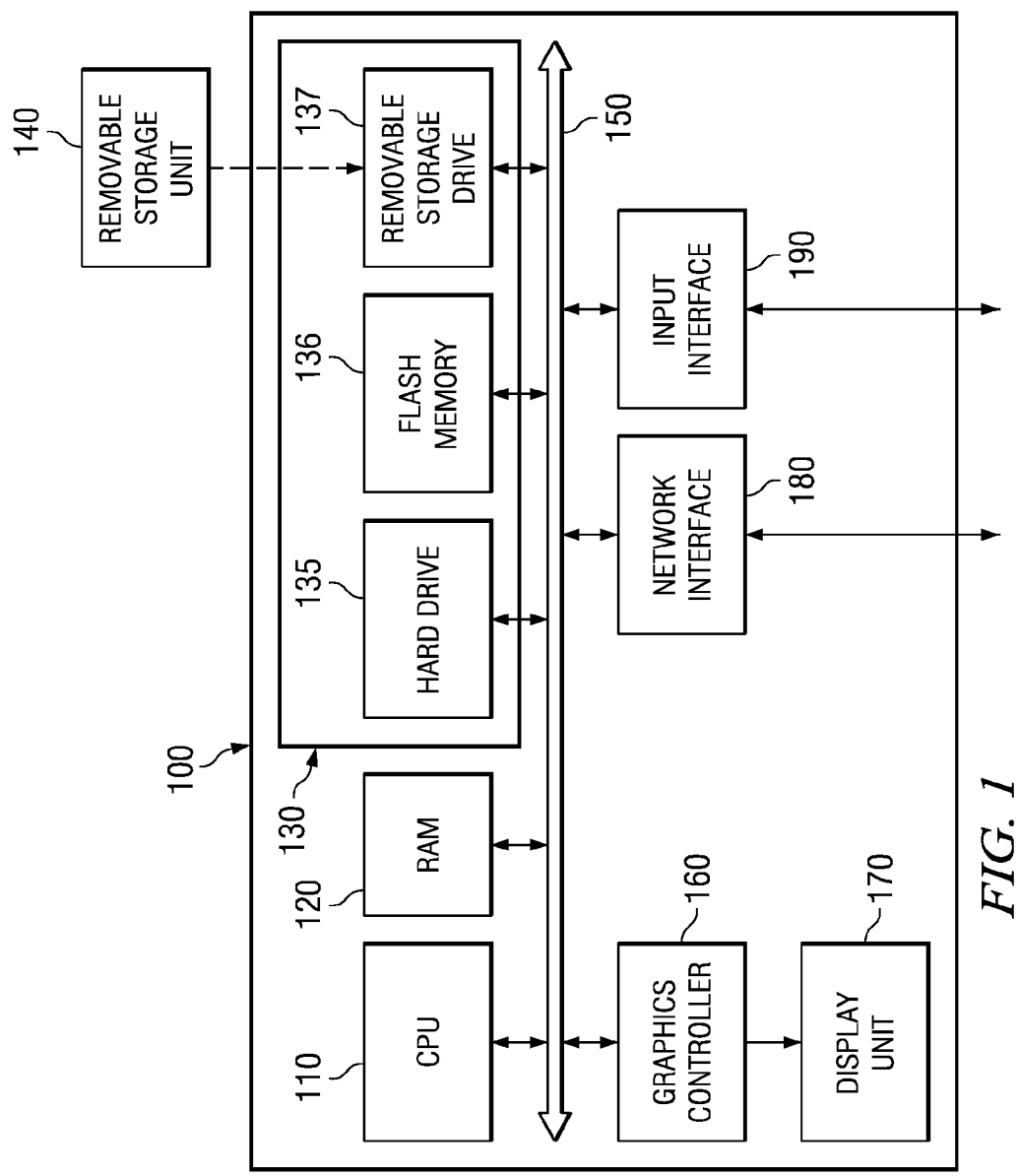

FIG. 1 is a block diagram of computer system 100 illustrating an example environment in which various aspect of the present invention. Computer system 100 may contain one or more processors such as central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention. CPU 110 may contain multiple processing units, with each processing unit potentially being designed for a specific task. Alternatively, CPU 110 may contain only a single processing unit.

RAM 120 may receive instructions from secondary memory 130 using communication path 150. Data representing Finite State Machines (FSM) of various applications may be stored and retrieved from secondary memory 130 (and/or RAM 120) during the execution of the instructions.

Graphics controller 160 generates display signals (e.g., in RGB format) to display unit 170 based on data/instructions received from CPU 110. Display unit 170 contains a display screen to display the images defined by the display signals. Input interface 190 may correspond to a key-board and/or mouse, and generally enables a user to provide inputs. Network interface 180 enables some of the inputs (and outputs) to be provided on a network. In general, display unit 170, input interface 190 and network interface 180 enable a user to design integrated circuits, and may be implemented in a known way.

Secondary memory 130 may contain hard drive 135, flash memory 136 and removable storage drive 137. Secondary memory 130 may store the data (e.g., representations of FSMs related to applications) and software instructions (e.g., to perform operations according to each FSM), which enable computer system 100 to provide several features in accordance with the present invention. Some or all of the data and instructions may be provided on removable storage unit 140, and the data and instructions may be read and provided by removable storage drive 137 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable storage medium having stored therein computer software and/or data. An embodiment of the present invention is implemented using software running (that is, executing) in computer system 100.

In this document, the term "computer program product" is used to generally refer to removable storage unit 140 or hard disk installed in hard drive 135. These computer program products are means for providing software to computer system 100. CPU 110 may retrieve the software instructions, and execute the instructions to provide various features of the present invention as described below in detail.

3. Method

Figure 2A:
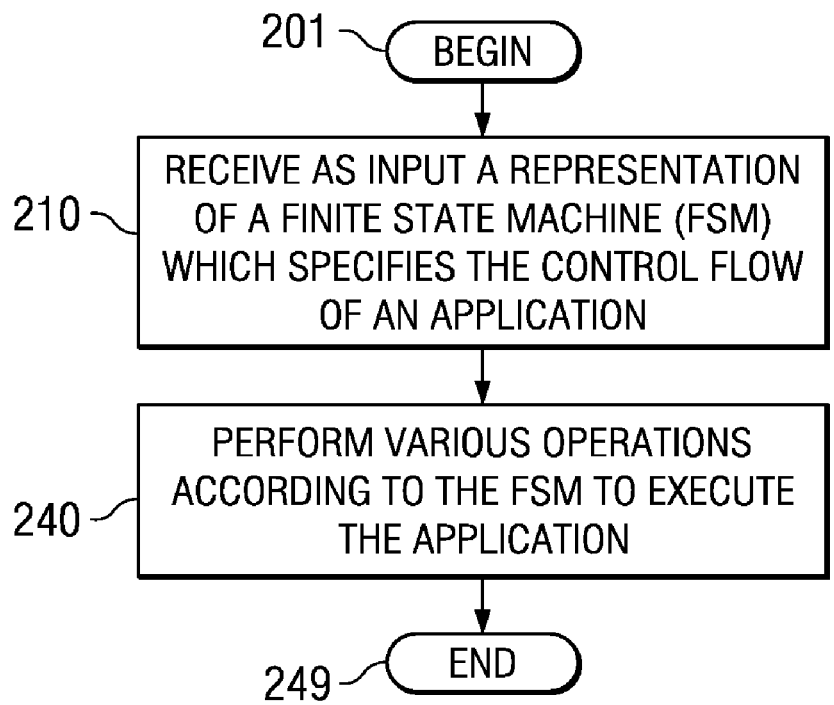
FIG. 2A is flowchart illustrating an example method using which applications can be implemented.

FIG. 2A is a flowchart illustrating the manner which an application (requiring access to multiple files) may be implemented according to an aspect of present invention. The description is provided with reference to FIG. 1 merely for illustration. Various aspects of the present invention can be implemented in other systems as well. The flowchart starts in step 201, in which control immediately passes to step 210.

In step 210, computer system 100 receives as input a representation of a finite state machine(FSM) which specifies the control flow of an application. The FSM may be specified by various states, events causing transitions between the states, the input files providing various inputs, and the various tasks to be performed in each transition. In an embodiment, each state is associated with utmost one file the application may be required to read data from. The representation of FSMs may be received from outside of computer system 100 or from within (e.g., from secondary memory).

In step 240, computer system 100 performs various operations according to the FSM to execute the application. In general, the operations are performed consistent with the state, event and task information to process the inputs provided by the various files. Control then passes to step 299, in which the method ends. The manner in which the flowchart can be implemented is described in further detail with reference to various examples.

4. Block Diagram

Figure 2B:
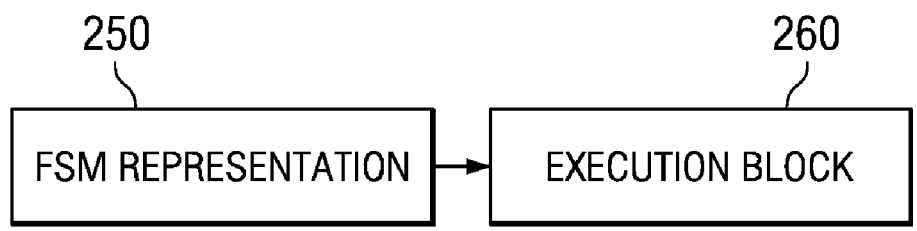
FIG. 2B is a block diagram illustrating an example approach for implementing application according to an aspect of the present invention.

FIG. 2B is a block diagram illustrative the manner in which applications can be implemented according to an aspect of the present invention. There are shown FSM representation 250 and execution block 260. As described with reference to step 210 above, FSM representation 250 represents the control flow of an application in the form of a FSM.

Execution block 260 may receive as input FSM representation 250, and perform various operations to execute the application represented by the FSM. Execution block 260 may be implemented in the form of a combination of one or more of hardware, software and firmware depending on the specific environment.

The implementation of the blocks of FIG. 2B is illustrated with reference to an example application below. The manner in which the application may be implemented in prior art is described first. The manner in which an FSM can be designed for the application is described then. Some implementation considerations for execution block 260 are then described.

5. Example Application in Prior Art

FIGS. 3A-3C together illustrate an example merge application. In particular, the data contained in FIGS. 3A and 3B is merged to generate the data in FIG. 3C. FIG. 3A is shown containing four rows (310, 315, 320 and 325) of data elements and FIG. 3B is shown containing two rows of data elements (330 and 340). The merged data elements are shown in the six rows (350, 365, 370, 380, 390 and 399).

As may be appreciated, the names in the rows of FIG. 3A are merged with the numbers of FIG. 3B, and when the numbers are exhausted first in FIG. 3B, the names of FIG. 3A are simply copied into FIG. 3C. In general, the merge application is described as being defined to copy of the rows of one input file to the output file if the rows in the other input file exhaust first.

FIG. 4 contains software code illustrating a typical prior approach of implementing the merge application depicted by the above example. Lines 410 through 440 contain a while loop in which a row from each of the input files N and H are retrieved into respective variables p and q, and the rows are written into file O. The while loop is repeated until an end-of-file is not reached for both the input files.

The while loop of steps 450 through 470 writes the remaining entries of file N into file O after the entries of file H are determined to be empty in the while loop of steps 410 through 440. Similarly, the while loop of steps 480 through 499 writes the remaining entries file H into file O after the entries of file N are determined to be empty in the while loop of steps 410 through 440.

Understanding software code of FIG. 4, at least in more complex applications, is often challenging. The manner in which several aspects of the present invention enable applications to be implemented is described below in further detail. First the manner in which the control flow can be represented by a FSM is illustrated below with reference to the merge application.

6. FSM

Figure 5:
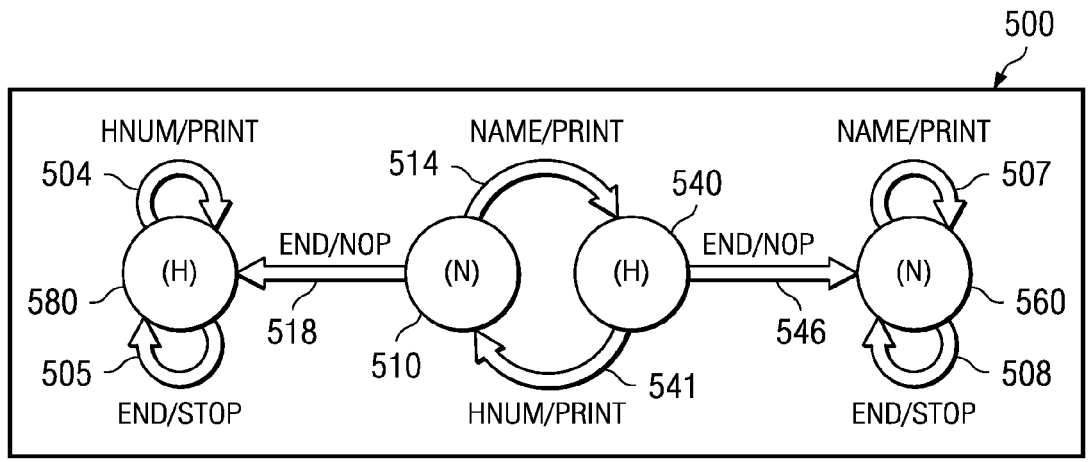
FIG. 5 is a state diagram illustrating a FSM used to implement merge operation.

FIG. 5 is shown containing state diagram 500 (example representation of an FSM) illustrating the manner in which the control flow of the merge application may be specified in an embodiment of the present invention. State machine 500 is shown containing four states—510, 540, 560 and 580. Each state is associated with utmost one input file. Thus, states 510 and 560 are shown associated with input file N, and states 540 and 580 are shown associated with input file H (as represented by the file name in parenthesis in each state).

State 510 represents the start state of the FSM. State 510 operates to read an input from the associated input file (N) and prints the input if a name is read as represented by the label NAME/PRINT with transition 514. It may be appreciated that state diagram 500 is shown containing only a few tasks—PRINT, NOP (no operation) and STOP. Each of such tasks may be implemented using any number of operations, which can be defined separately by a designer of the applications. In addition, STOP is a special task analogous to a stop state in FSM. It signifies the end of processing.

Transition 514 indicates that the next state is state 540. If the inputs are exhausted (shown by END), control passes to state 580 without performing any task (shown by NOP). State 540 reads inputs (HNUM) from file H, and transitions to state 510 if an input is successfully read. During transition, the HNUM input is printed. Thus, the loop of states 510 and 540 implements the while loop of lines 410-440 of FIG. 4. If no input is available from file H, control passes to state 560.

State 560 operates to print the remaining inputs of file N. When the end of file N is reached, a stop task is specified associated with the transition. Due to the execution of the stop task, the FSM stops. Thus, the stop task in all the states specifies a stop state as well in that there is no additional transitions/actions when the stop task is encountered. As may be readily observed, state 560 implements the loop of lines 450-470 of FIG. 4. Similarly, state 580 implements the loop of lines 480-499 of FIG. 4.

Thus, it may be appreciated that state diagrams may be used to specify the control flow of an application. However, the non-textual representations are often not suitable for further processing by computer systems. Accordingly, the manner in which control flow may be specified in textual form is described below.

7. Textual Representation of FSM

Figure 6:
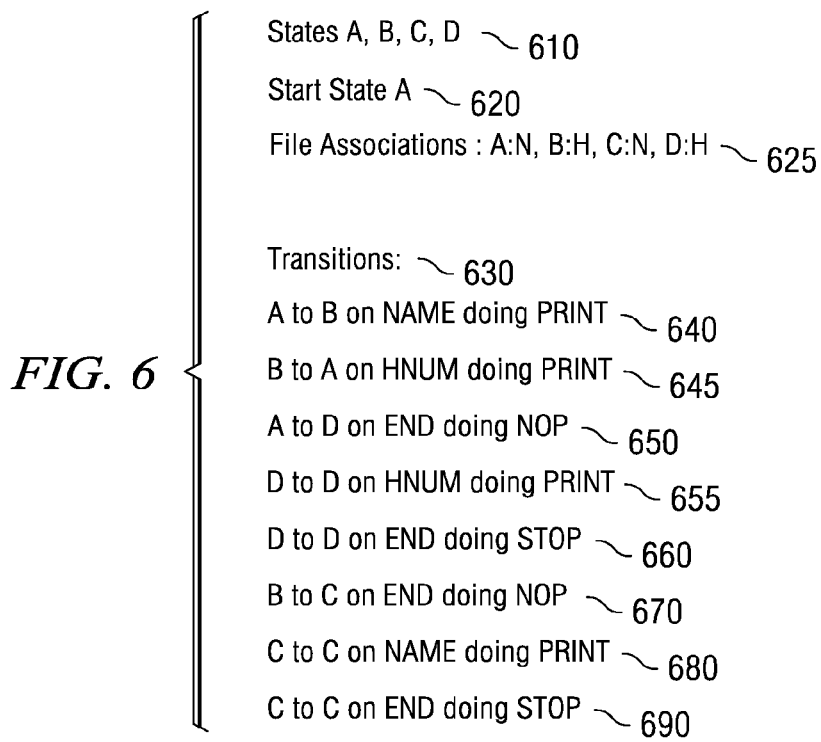
FIG. 6 illustrates a textual representation of a FSM to implement a merge application in an embodiment of the present invention.

FIG. 6 is shown containing statements representing the FSM described above. Line 610 indicates that there are four states A, B, C and D (respectively corresponding to 510, 540, 560, and 580 of FIG. 5). Line 620 indicates that the start state is A. Line 625 indicates that states A, B, C, and D are respectively associated with input files N, H, N and H.

Lines 630-690 indicate the transitions between the states depending on the inputs retrieved from the associated file, and the tasks associated with the transitions. It may be observed that lines 640, 645, 650, 655, 660, 670, 680 and 690 respectively represent the transitions 514, 541, 518, 504, 505, 546, 507 and 508.

While the tasks are shown as simple print statements, it should be understood that more complex tasks may be implemented associated with the transitions. Similarly, FSMs with more states may also be used to implement complex applications. The description is continued with reference to the manner in which execution block 260 may be implemented.

8. Execution block

Figure 7:
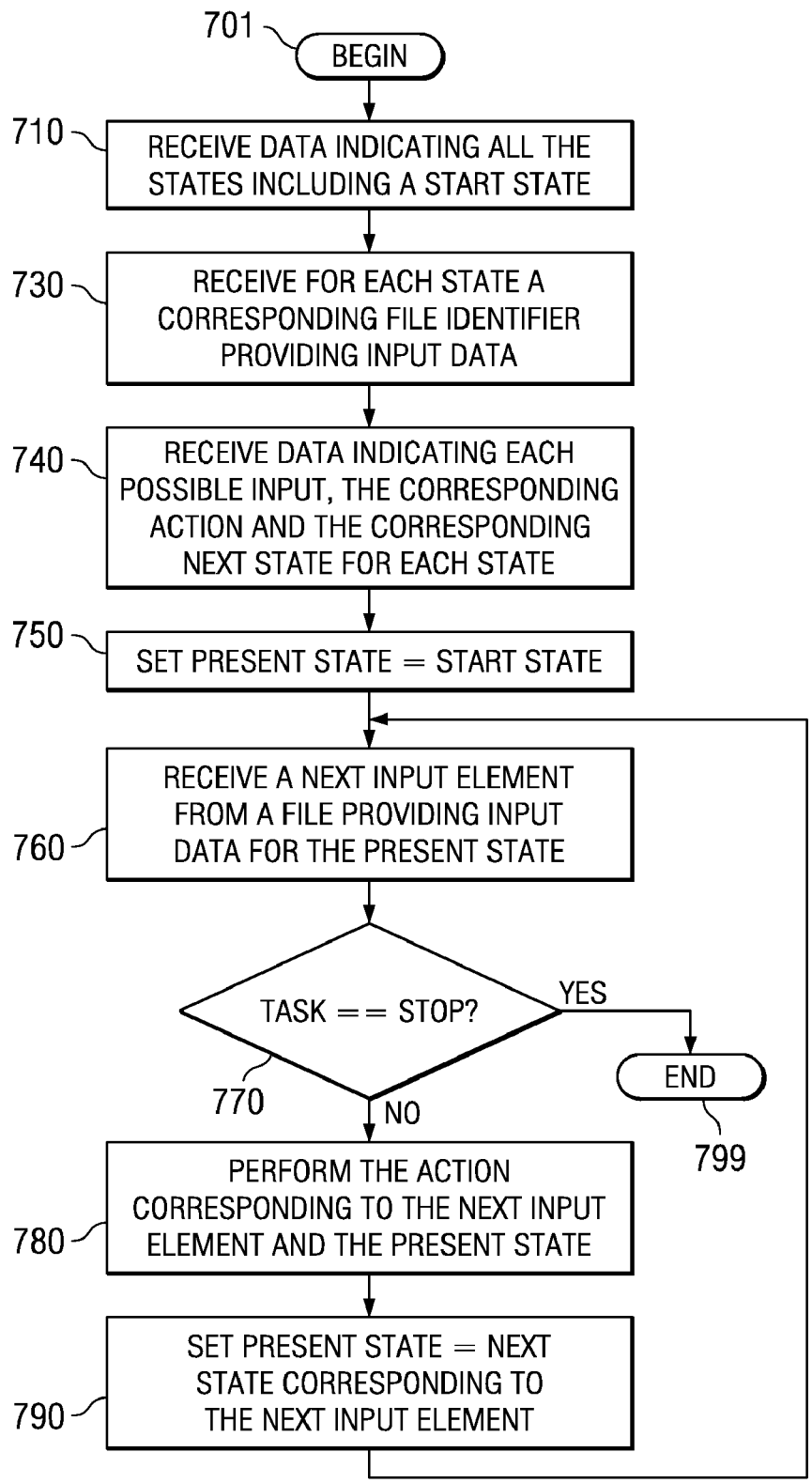
FIG. 7 is a flowchart illustrating the manner in which a FSM representation can be processed to implement applications in an embodiment of the present invention.

FIG. 7 is a flow chart illustrating a method by which an execution block is implemented according to an aspect of the present invention. The flowchart is described with reference to FIGS. 1 and 6 for illustration. However, the flow-chart can be implemented with other systems and FSMs as well. The method begins in step 701, in which control is immediately transferred to step 710.

In step 710, CPU 110 receives data indicating all the states including a start state. With respect to the textual representation of FIG. 6, CPU 110 may receive lines 610 and 620. In step 730, CPU 110 receives for each state a corresponding file identifier providing input data. With respect to the textual representation of FIG. 6, CPU 110 may receive line 625.

In step 740, CPU 110 receives data indicating each possible input, the corresponding task and the corresponding next state for each state. In the case of transitions with a stop task, a next state is not present. Accordingly, the state from which such a transition originates may also be considered a stop state. With respect to the textual representation of FIG. 6, CPU 110 may receive lines 640-690.

In step 750, CPU 110 sets the present state to a start state. With respect to FIG. 6, the present state may be set to state A. In step 760, CPU 110 receives a next input element from a file providing input data for the present state. The next input element corresponds to the first element when the file is accessed the first time.

In step 770, CPU 110 determines whether the task associated with the transition corresponding to the next input element equals STOP. If the STOP task is to be performed, control passes to step 799, in which the FSM (method) ends. Otherwise, control passes to step 780.

In step 780, CPU 110 performs the task specified for the present state corresponding to the next input element (received in step 760). With reference to FIG. 3A, as a name 'TOM' would be retrieved, the task PRINT would be performed as specified in line 640.

In step 790, CPU 110 sets the present state equal to next state corresponding to the next input element. For example, the present state may be set to next state B as specified in line 640 when TOM is read. Control then passes to step 760. The loop of steps 760-790 may be repeated until a STOP task is encountered.

Thus, the flow-chart of FIG. 7 causes CPU 110 to performs various operations to cause the corresponding application(s) to be implemented.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of implementing an application, said method comprising:

receiving as input a representation of a finite state machine (FSM) which specifies a control flow of said application;

examining said FSM and performing a plurality of operations according to said FSM to execute said application;

wherein said examining comprises:
- (a) setting a present state equal to a start state;
- (b) receiving a next input associated with a first file providing inputs to said present state;
- (c) determining a next transition according to said next input, wherein said next transition indicates a next state and a corresponding next task;
- (d) performing a subset of operations according to said corresponding next task;
- (e) setting said present state equal to said next state; and
- (f) determining whether said present state is equal to a stop state;
- (g) performing said (b) through (e) if said present state is not equal to said stop state.

2. The method of claim 1, wherein said application is designed to receive inputs from a plurality of files, said plurality of files providing a specific input value, wherein each of said plurality of states is associated with utmost one of said plurality of files.

3. The method of claim 1, wherein said representation is in one of textual form or graphic form.

4. A computer readable medium carrying one or more sequences of instructions for causing a system to implement an application, wherein execution of said one or more sequences of instructions by one or more processors contained in said system causes said one or more processors to perform the actions of:

receiving as input a representation of a finite state machine (FSM) which specifies a control flow of said application;

examining said FSM and performing a plurality of operations according to said FSM to execute said application;

wherein said examining comprises:
- (a) setting a present state equal to a start state;
- (b) receiving a next input associated with a first file providing inputs to said present state;
- (c) determining a next transition according to said next input, wherein said next transition indicates a next state and a corresponding next task;
- (d) performing a subset of operations according to said corresponding next task;
- (e) setting said present state equal to said next state; and
- (f) determining whether said present state is equal to a stop state;
- (g) performing said (b) through (e) if said present state is not equal to said stop state.

5. The computer readable medium of claim 4, wherein said application is designed to receive inputs from a plurality of files, said plurality of files providing a specific input value, wherein each of said plurality of states is associated with utmost one of said plurality of files.

6. The computer readable medium of claim 4, wherein said representation is in one of textual form or graphic form.

7. A system implementing an application, said system comprising:

means for receiving as input a representation of a finite state machine (FSM) which specifies a control flow of said application;

means for examining said FSM and performing a plurality of operations according to said FSM to execute said application;

wherein said means for examining comprises:
- (a) setting a present state equal to a start state;
- (b) receiving a next input associated with a first file providing inputs to said present state;
- (c) determining a next transition according to said next input, wherein said next transition indicates a next state and a corresponding next task;
- (d) performing a subset of operations according to said corresponding next task;
- (e) setting said present state equal to said next state;
- (f) determining whether the present state is equal to a stop state;
- (g) and performing said (b) through (e) if said present state is not equal to said stop state and receives a next input associated with a first file providing inputs to said present state, said means for examining determining a next transition according to said next input, wherein said next transition indicates a next state and a corresponding next task, said means for examining performing a subset of operations according to said corresponding next task and 8. The system of claim 7, wherein said application is designed to receive inputs from a plurality of files, said plurality of files providing a specific input value, wherein each of said plurality of states is associated with utmost one of said plurality of files.

9. The system of claim 7, wherein said representation is in one of textual form or graphic form.

* * * * *